W. R. POWERS.
NUT LOCK.
APPLICATION FILED NOV. 19, 1912.
1,083,133.
Patented Dec. 30, 1913.
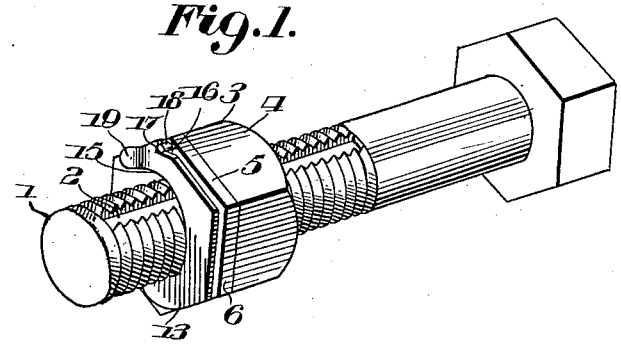
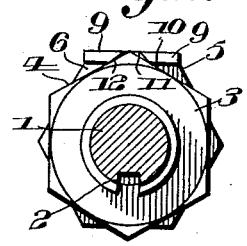
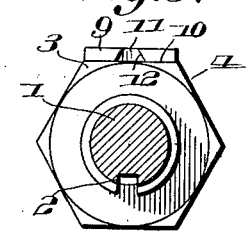
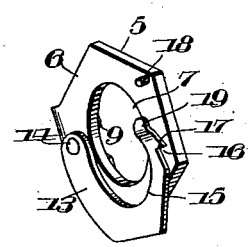
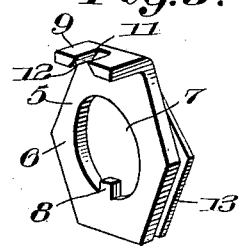
Inventor
William R. Powers
Witnesses
By Victor J. Evans
Attorney

UNITED STATES PATENT OFFICE.

WILLIAM R. POWERS, OF HOLDEN, WEST VIRGINIA.

NUT-LOCK.

1,083,133.     Specification of Letters Patent.     Patented Dec. 30, 1913.

Application filed November 19, 1912. Serial No. 732,255.

*To all whom it may concern:*

Be it known that I, WILLIAM R. POWERS, a citizen of the United States, residing at Holden, in the county of Logan and State of West Virginia, have invented new and useful Improvements in Nut-Locks, of which the following is a specification.

This invention relates to nut locks; and has for an object to provide a device of this character which may be used in connection with any standard form of nut without requiring any change whatever in the construction therein and which will accommodate itself to a longitudinally grooved bolt and associated therewith at one side of the nut, so as to positively hold the same against retrograde rotation.

Another object of the invention is to provide a device of this character which can be connected with the nut and with the bolt in such manner as will warrant fine adjustments of the former on the latter.

A still further object of the invention is to provide a lock which may be operatively connected with or disconnected from the nut and the bolt with the minimum of labor.

With these and other objects in view, the invention consists of certain novel features of construction, combination and arrangement of parts, as will be hereinafter described and claimed.

In the accompanying drawings:—Figure 1 is a perspective view of the nut lock, showing its application to a nut and bolt; Fig. 2 is a transverse section through the bolt, showing the lock in elevation and illustrating the application of the locking portion to one of the corners of the nut; Fig. 3 is a similar view, showing the application of a locking portion to one of the side surfaces of the nut; Fig. 4 is a perspective view of the locking member detached from the bolt; and Fig. 5 is a view similar to Fig. 4, looking toward the opposite side of the lock.

The bolt 1 herein illustrated is provided throughout its threaded area with a longitudinally-extending groove 2, the nut 3 being of the usual well known construction and of a configuration furnishing angularly disposed wrench engaging surfaces 4.

The lock 5 comprises a washer or disk 6 of minimum thickness as compared with the thickness of the nut 3 and of a configuration preferably conforming to that of the nut. The disk is provided with an opening 7, through which the bolt 1 is adapted to be projected so that a portion of the thread of the bolt may be exposed to the effective locking action of the thread engaging element. With a view to holding the bolt against rotating in the nut, I provide the disk 6 with a lug 8, which extends into the bolt receiving opening 7 and which is designed to accommodate itself in the groove 2 of the bolt at any point in the length of the groove.

The locking disk 6 is provided with right angularly projecting lugs 9, which are provided with flat surfaces 10 that are disposed in the same general plane so that the surfaces of both lugs may be brought into mutual contact with one of the flat wrench surfaces 4 of the nut on one position of the nut on the bolt. The lugs 9 are spaced relatively so as to present an intervening slot 11 therebetween. The inner edges of the lugs are beveled, as at 12, so that on another position of the nut on the bolt a corner of the nut will be disposed in the recess 11 between the lugs when the latter are forced over two of the adjacent surfaces 4 of the nut. In this manner very fine adjustments of the nut may be made on the thread of the bolt and a positive locking action of both the nut and the bolt can be effected. A locking element 13, which comprises a thin sheet of steel is eccentrically disposed with relation to the bolt opening 7 and as illustrated, said element is pivoted at one of its ends, as at 14, to the disk 6. The element is adapted to be swung around the bolt so as to cause the arcuate gripping surface 15 of the element to engage in one of the thread grooves immediately at one side of the nut 3. The opposite end of the element 13 is recessed, as at 16, and provided with a shoulder 17, which is adapted for locking engagement with an integral keeper projection 18, which extends from one side of the disk 6. A combined manipulating and guiding portion 19 of the element 13 is bent away from the plane of the main body of said element so as to lie in spaced relation to the disk 6, whereby it may be conveniently manipulated when it is desired to release the shoulder 17 from the keeper 18. The construction is also desirable in that the shoulder 17 may be guided behind the keeper on adjustment of the element 13 to an operative locked position.

Now that the details of construction of the device is clearly described, it is seen that after the nut is threaded to the proper position upon the bolt and associated with the work, the disk 6 is adjusted onto the bolt so that the projection 8 extends into the receiving groove 2. The disk 6 comes into flat contact with the adjacent surface of the nut and the lugs 9 will be made to project over the sides of the nut and to lie in proper contact with one of the surfaces 4 or two of said surfaces according to the adjustment of the nut with relation to the groove 2 of the bolt. The element 13 is then swung around the bolt and locked in the previously described manner to the disk 6 and engaged in one of the thread grooves of the bolt so that the nut and the bolt will be held positively against retrograde movements.

From the foregoing description, taken in connection with the accompanying drawings, the construction and operation of the invention will be readily understood without requiring a more extended explanation.

Having thus described my invention, what I claim is:—

In a nut lock, the combination with a bolt having a longitudinal groove therein and a nut threaded to receive the bolt, of a disk having a shape corresponding substantially with that of the nut and provided with a central passage having a smooth wall for the reception of the bolt, a radial lug carried by the disk and extending into the opening thereof and into the groove of the bolt, the said disk being provided with straight faces lying flush with the straight faces of the nut, spaced lugs formed on one of the straight faces of the disks and provided with beveled inner surfaces for mutual engagement with two of the straight surfaces of the nut on one adjustment of the latter on the bolt, a pivotally mounted gripping device pivotally mounted on the disk and adjustable relatively of the opening thereof and adapted to be projected partly across the opening and to engage in the adjacent thread of the bolt and means on the disk for holding said device in an applied position.

In testimony whereof I affix my signature in presence of two witnesses.

WILLIAM R. POWERS.

Witnesses:
J. O. HILL,
A. L. POWERS.

---

Copies of this patent may be obtained for five cents each, by addressing the "Commissioner of Patents, Washington, D. C."